(12) United States Patent
Yamada

(10) Patent No.: US 8,760,716 B2
(45) Date of Patent: Jun. 24, 2014

(54) IMAGE FORMING APPARATUS, IMAGE FORMING METHOD, AND COMPUTER-READABLE RECORDING MEDIUM STORING PRINT RESTRICTION PROGRAM CODE

(75) Inventor: Muneki Yamada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 480 days.

(21) Appl. No.: 13/074,724

(22) Filed: Mar. 29, 2011

(65) Prior Publication Data

US 2011/0242560 A1    Oct. 6, 2011

(30) Foreign Application Priority Data

Mar. 30, 2010  (JP) ................................ 2010-078714

(51) Int. Cl.
*H04N 1/60*  (2006.01)

(52) U.S. Cl.
USPC ........... 358/1.9; 358/1.13; 358/1.14; 358/501

(58) Field of Classification Search
USPC ......... 358/1.1, 1.9, 1.13, 1.14, 500, 501, 400, 358/401, 434, 437
See application file for complete search history.

(56) References Cited

U.S. PATENT DOCUMENTS

| | | | | |
|---|---|---|---|---|
| 6,471,314 | B2 * | 10/2002 | Doi | ................................... 347/5 |
| 6,977,752 | B1 * | 12/2005 | Barry et al. | ..................... 358/1.9 |
| 7,436,552 | B2 * | 10/2008 | Nozato | .......................... 358/406 |
| 2007/0059015 | A1 | 3/2007 | Sakita et al. | |
| 2007/0064257 | A1 | 3/2007 | Inoue et al. | |
| 2008/0192271 | A1 | 8/2008 | Kato et al. | |

FOREIGN PATENT DOCUMENTS

| | | |
|---|---|---|
| JP | 2001-088407 | 3/2001 |
| JP | 2006-287461 | 10/2006 |
| JP | 2007-078887 | 3/2007 |
| JP | 2007-090822 | 4/2007 |
| JP | 2008-199386 | 8/2008 |

\* cited by examiner

*Primary Examiner* — Thomas D Lee
(74) *Attorney, Agent, or Firm* — McDonnell Boehnen Hulbert & Berghoff LLP

(57) ABSTRACT

An image forming apparatus includes a print processing unit and a printing ratio determination unit. The print processing unit is configured to obtain a printing ratio of document data at a time of print execution of the document data, and associate printing ratio data indicating the obtained printing ratio with the document data. The printing ratio determination unit is configured to identify the printing ratio of the document data from the printing ratio data associated with the document data and determine whether or not the identified printing ratio satisfies a specified condition.

11 Claims, 10 Drawing Sheets

User Box Document List

☑ Document Name : document001

☐ Document Name : document002

☐ Document Name : document003

☐ Document Name : document004  [ Select ]

☐ Document Name : document005  [ Cancel ]

FIG. 4

User Box   Stored Document Detail Screen

Document Name : document001

User Name : Kyocera

Color Information : Color

Number of Pages : 3 pages

Stored Date and Time : 2000/1/1

Printing Ratio : K · · · 4 %
C · · · 2 %
M · · · 7 %
Y · · · 2 %

[ Print ]   [ Close ]

FIG. 5A

User Box   Stored Document Detail Screen

Document Name : document001

User Name : Kyocera

Color Information : Color

Number of Pages : 3 pages

Stored Date and Time : 2000/1/1

Printing Ratio : K · · · - %
C · · · - %
M · · · - %
Y · · · - %

[ Print ]   [ Close ]

FIG. 5B

| Color Print Restriction Setting | | |
|---|---|---|
| User Name | | |
| ✓ | Kyocera | |
| ☐ | Yamada | |
| ☐ | Satoh | Select |
| ☐ | Suzuki | Cancel |

FIG. 7

| Color Print Restriction Setting | | | |
|---|---|---|---|
| User Name : Kyocera | | | |
| ☑ Black | 005 | % | |
| ☐ Cyan | 000 | % | |
| ☑ Magenta | 003 | % | OK |
| ☐ Yellow | 000 | % | Cancel |

FIG. 8

IMAGE FORMING APPARATUS, IMAGE FORMING METHOD, AND COMPUTER-READABLE RECORDING MEDIUM STORING PRINT RESTRICTION PROGRAM CODE

REFERENCE TO RELATED APPLICATIONS

This application is based upon and claims the benefit of priority from the corresponding Japanese Patent Application No. 2010-78714, filed in the Japan Patent Office on Mar. 30, 2010, the entire contents of which is incorporated herein by reference.

BACKGROUND

1. Technical Field

The present disclosure relates to an image forming apparatus, an image forming method, and a computer-readable recording medium storing a print restriction program.

2. Description of the Related Art

A typical image forming apparatus forms an image on a sheet using a color material, such as toner or ink, for printing. As the color material is a consumable supply, a cartridge filled with the color material is mounted to the image forming apparatus. Then, the color material is taken out from the cartridge and used, and when the cartridge becomes empty, the empty cartridge is replaced by a cartridge filled with the color material.

In one image forming apparatus, when a certain amount of toner is consumed from a state that the toner cartridge is filled with the toner, a color print is restricted. With this image forming apparatus, until the certain amount of toner is consumed, printing can be carried out without restrictions.

Also, in another image forming apparatus, the toner consumption amount during a period of time specified by an administrator is calculated and displayed to the administrator. In this image forming apparatus, when the toner consumption amount is desired to be suppressed, a user intentionally restricts usage of the image forming apparatus.

SUMMARY

An image forming apparatus according to an embodiment of the present disclosure includes a print processing unit and a printing ratio determination unit. The print processing unit is configured to obtain a printing ratio of document data at a time of print execution of the document data and associate printing ratio data indicating the obtained printing ratio with the document data. The printing ratio determination unit is configured to identify the printing ratio of the document data from the printing ratio data associated with the document data and determine whether or not the identified printing ratio satisfies a specified condition.

A computer-readable recording medium according to an embodiment of the present disclosure stores a print restriction program code executed by a computer of an image forming apparatus or a host device connected to the image forming apparatus. The print restriction program code includes first and second sub program codes. The first sub program code causes the computer to obtain a printing ratio of document data at a time of print execution of the document data and associate printing ratio data indicating the obtained printing ratio with the document data. The second sub program code causes the computer to identify the printing ratio of the document data from the printing ratio data associated with the document data and determine whether or not the identified printing ratio satisfies a specified condition.

An image forming method according to an embodiment of the present disclosure includes (i) a print processing unit obtaining a printing ratio of document data at a time of print execution of the document data and associating printing ratio data indicating the obtained printing ratio with the document data and (ii) a printing ratio determination unit identifying the printing ratio of the document data from the printing ratio data associated with the document data and determining whether or not the identified printing ratio satisfies a specified condition.

Additional features and advantages are described herein, and will be apparent from the following Detailed Description and the figures.

BRIEF DESCRIPTION OF THE DRAWINGS

In the accompanying drawings:

FIG. 4 illustrates an example list of the document data in the document box;

FIG. 5A illustrates an example attribute information of the document data;

FIG. 5B illustrates an example display screen for the attribute information of the document data;

FIG. 7 illustrates an example list of registered users based on user data;

FIG. 8 illustrates an example setting screen for setting condition data on whether printing can be carried out or not in terms of printing ratio;

DETAILED DESCRIPTION

Hereinafter, embodiments of the present disclosure will be described on the basis of drawings.

First Embodiment

Figure 1:
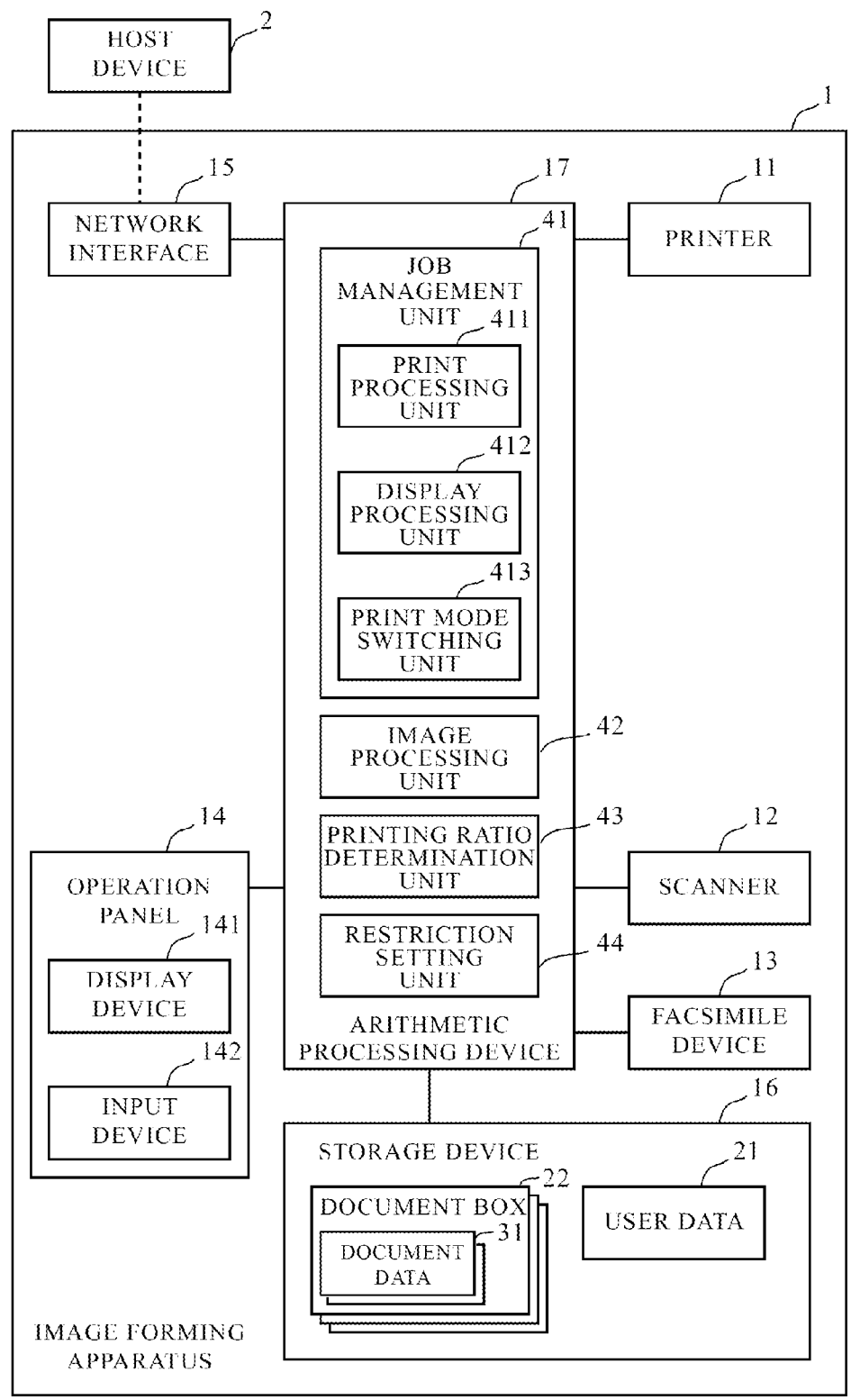
FIG. 1 illustrates a block diagram of a configuration of an image forming apparatus according to a first embodiment of the present disclosure.

FIG. 1 is a block diagram of a configuration of an image forming apparatus according to a first embodiment of the present disclosure.

Image forming apparatus 1 is an image forming apparatus according to the first embodiment. Image forming apparatus 1 is provided with printer 11, scanner 12, facsimile device 13, operation panel 14, network interface 15, storage device 16, and arithmetic processing device 17.

Image forming apparatus 1 performs a user authentication before a user starts to use the image forming apparatus. Image forming apparatus 1 displays a login screen as an initial screen. When a user ID and a password of a registered user are input to the login screen, image forming apparatus 1 permits logging-in and displays an operation screen for instructions so as to execute various jobs.

Printer 11 is an internal device that prints a document image based on print data.

Scanner 12 is an internal device that optically reads a document image from a document and generates image data of the document image.

Facsimile device 13 generates a facsimile signal from document data 31 that should be transmitted and transmits the facsimile signal. In addition, facsimile device 13 is an internal device that receives the facsimile signal to be converted into document data 31.

Operation panel 14 is arranged on a casing front surface of image forming apparatus 1 and has display device 141 that displays various pieces of information to the user and input device 142 that detects user operations. For display device 141, for example, a liquid crystal display is used. For input device 142, a key switch, a touch panel, and the like are used.

Network interface 15 is a circuit connected to a network not illustrated in the drawing and adapted to perform a data communication with another device (host device 2 or the like) that is connected to the network.

Also, storage device 16 stores the various pieces of information. For storage device 16, for example, a non-volatile large-capacity storage medium such as a non-volatile memory or a hard disk drive is used.

Storage device 16 stores user data 21. User data 21 includes an ID of a registered user, a login password, and other attribute information.

Also, for storage device 16, document box 22 is provided for each user. Document box 22 stores document data 31. Document data 31 is generated through image reading by scanner 12, generated from the facsimile signal received by facsimile device 13, or stored in response to a request from host device 2.

Also, storage device 16 temporarily stores the print data generated from document data 31 at the time of the printing of the document. The print data is obtained through image processing including various procedures such as rasterizing and halftoning.

Figure 2:
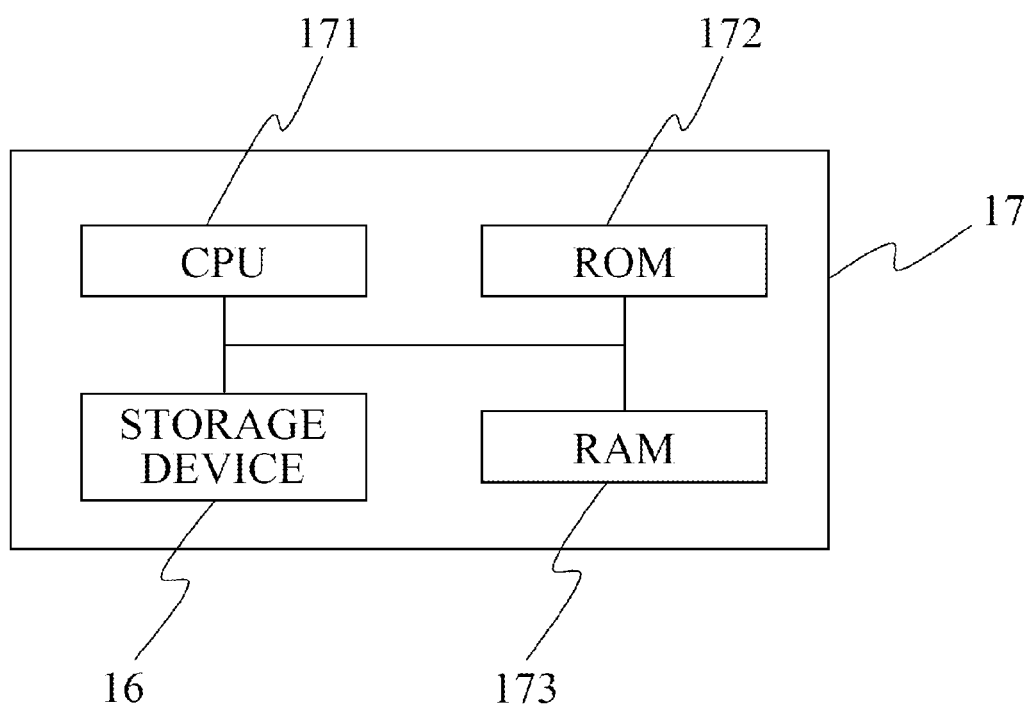
FIG. 2 illustrates a hardware architecture of an arithmetic processing device of the image forming apparatus according to the first embodiment.

Arithmetic processing device 17 is a computer that executes a print processing program code including a print restriction program code. As illustrated in FIG. 2, arithmetic processing device 17 is a computer having CPU (Central Processing Unit) 171, ROM (Read Only Memory) 172, RAM (Random Access Memory) 173, and the like. Arithmetic processing device 17 loads the print processing program code from ROM 172, storage device 16, or the like onto RAM 173 and executes the loaded program code by CPU 171 so as to operate as various processing units.

According to the first embodiment, by executing the print processing program code, as illustrated in FIG. 1, arithmetic processing device 17 operates job management unit 41, image processing unit 42, printing ratio determination unit 43, and restriction setting unit 44.

Job management unit 41 has print processing unit 411, display processing unit 412, and print mode switching unit 413.

Print processing unit 411 accepts job execution requests from host device 2 or input device 142 and sequentially executes the jobs. The job execution requests includes a print request, a copy request, a facsimile transmission request, a box storage request such as a scan image (storage of document data 31 into document box 22), and the like. The job is executed on the basis of set values (for example, the presence or absence of rotation of the document image, an enlargement ratio, a reduction ratio, and the like) specified via host device 2 or input device 142 at the time of the job execution request. Print processing unit 411 further causes printer 11 to execute or prohibit printing of document data 31 in accordance with whether or not the printing can be performed with regard to a printing ratio of document data 31 of the print target by printing ratio determination unit 43.

Display processing unit 412 displays an error screen on display device 141 when the printing ratio determination unit 43 determines that the printing ratio of document data 31 does not satisfy a specified condition.

After the display start of the error screen, if the user operation for selecting another printable print mode is detected by input device 142, print mode switching unit 413 switches the print mode to the other print mode. The other print modes include a monochrome print at a time when a color print is specified, a print mode with a printing ratio lower than the current print mode (a draft print mode, an eco-print mode, etc.) and the like.

Image processing unit 42 executes the image processing of document data 31 to generate the print data. The image processing includes procedures such as rasterizing, halftoning, and the like necessary for the job executions in addition to procedures such as rotation, enlargement, reduction, and the like based on the set values specified by the job execution requests.

Printing ratio determination unit 43 identifies the printing ratio of document data 31 of the print target and determines whether or not the identified printing ratio satisfies the specified condition. Print processing unit 411 causes printer 11 to execute the printing based on document data 31 of the print target if printing ratio determination unit 43 determines that the printing ratio satisfies the specified condition.

According to the first embodiment, print processing unit 411 obtains the printing ratio of document data 31 at the time of the execution of the printing and associates printing ratio data indicating the printing ratio with document data 31. The printing ratio data associated with document data 31 is stored in document box 22.

Printing ratio determination unit 43 identifies the printing ratios for the respective toner colors and determines whether or not the identified printing ratios satisfy the specified condition. Printing ratio determination unit 43 reads the printing ratio data corresponding to document data 31 of the print target from document box 22 to identify the printing ratio.

The printing ratio is calculated as a proportion of the number of dots printed on the printed image to an image processing result by image processing unit 42 (that is, the print data after the image processing). If the printing of document data 31 of the print target has not been executed and thus the printing ratio data of document data 31 is not stored, printing ratio determination unit 43 causes image processing unit 42 to execute the image processing that is a preprocessing of the printing on document data 31 to calculate the printing ratio. It should be noted that at this time point, the printing is not executed.

It should be noted that the condition for determining whether or not the printing can be carried out on the basis of the printing ratio is set as condition data for each user. The condition data is stored in document box 22 as attribute information in user data 21. Printing ratio determination unit 43 identifies the user who requests the printing of document data 31, identifies the specified condition for the user, and determines whether or not the printing ratio of document data 31 satisfies the condition specified by the condition data. Printing ratio determination unit 43 identifies the user who has logged in image forming apparatus 1 as the user who requests the printing or identifies the user who requests the printing from the user ID or the like included in the job execution request from host device 2. In this manner, by changing the conditions for each user, in accordance with the use situations and the use purposes of the respective users, the consumption amount of the color material may effectively be suppressed.

Restriction setting unit 44 sets the condition on whether or not the printing can be carried out with regard to the printing ratio for each user while following the user operation on input device 142 by the administrator. Restriction setting unit 44 generates the condition data to be reflected on user data 21 while following the user operation.

Next, an operation of image forming apparatus 1 will be described. Described herein are (a) a processing at the time of the printing of the document image based on document data 31 and (b) a processing at the time of setting of the condition data on whether or not the printing can be carried out with regard to the printing ratio.

Figure 3:
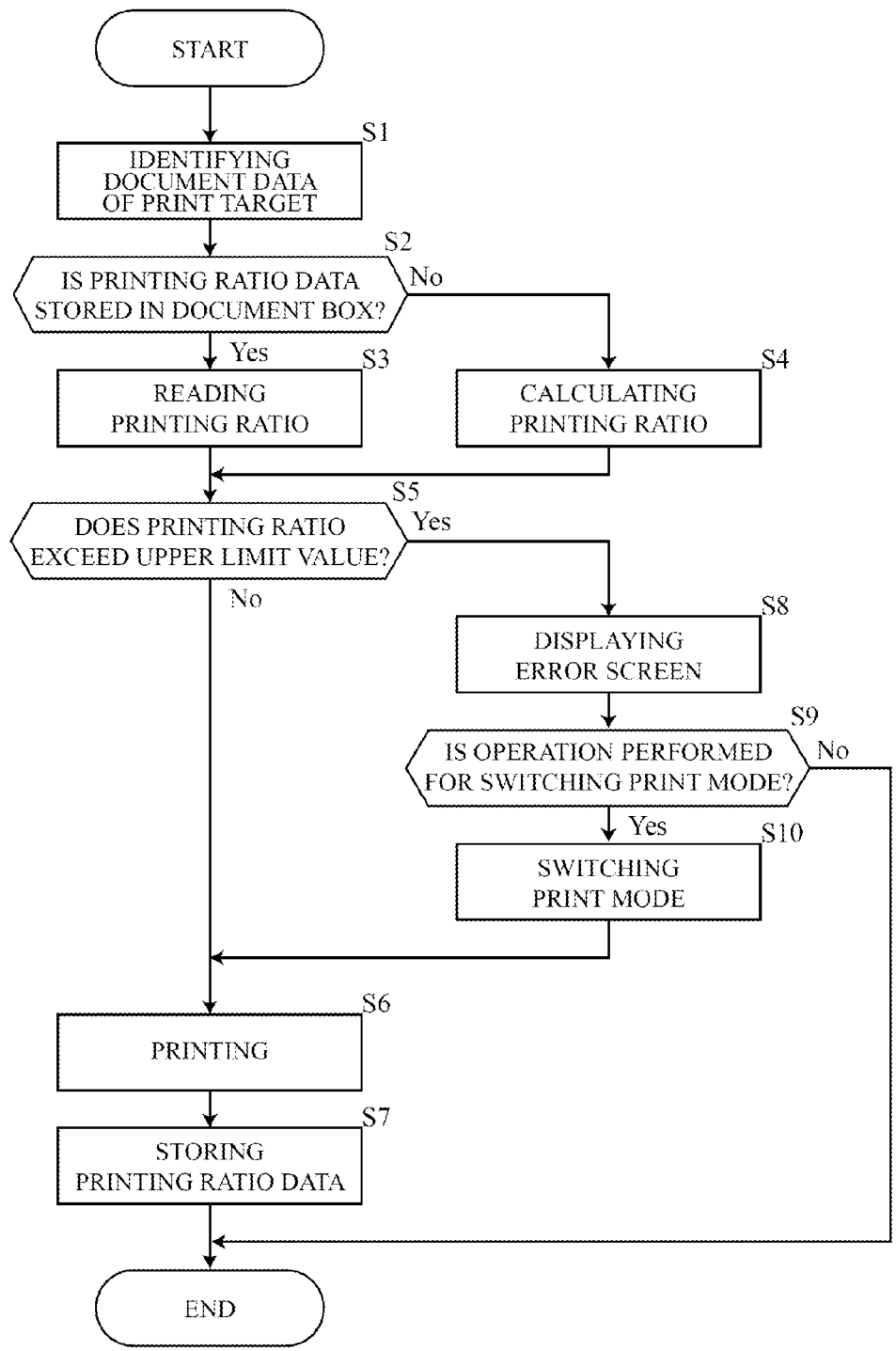
FIG. 3 illustrates a flow chart for describing a processing at the time of printing a document image based on document data in a document box in the image forming apparatus according to the first embodiment.

(a) Processing at the Time of the Printing of the Document Image Based on the Document Data FIG. 3 is a flow chart for describing a processing at the time of printing a document image based on document data in a document box in the image forming apparatus according to the first embodiment.

If the job execution request for the printing based on the document data is generated, the printing ratio determination unit identifies the user who performs the job execution request. The display processing unit displays a list of the document data stored in the document box of the user on the display device and identifies the document data selected from the list as the document data of the print target (step S1).

FIG. 4 illustrates an exemplary list of the document data in the document box that is displayed in the image forming apparatus according to the first embodiment. As illustrated in FIG. 4, on an operation screen of the display device, check boxes with regard to the respective pieces of document data are displayed. If the check box is checked and the selection button is pressed by the user while operating the input device, the document data of the check box thus checked is selected.

As illustrated in FIG. 3, when the document data of the print target is identified, the printing ratio determination unit determines whether or not the printing ratio data with regard to the document data of the print target is stored in the document box (step S2).

If the printing ratio data with regard to the document data of the print target is stored in the document box, the printing ratio determination unit reads the printing ratio data (step S3).

In this manner, a determination on whether or not the printing is prohibited is promptly carried out by using the printing ratio stored in the document box instead of calculating the printing ratio based on the print data again.

On the other hand, if the printing ratio data with regard to the document data of the print target is not stored in the document box, the printing ratio determination unit causes the image processing unit to execute the image processing on the document data. The printing ratio determination unit calculates the printing ratio based on the print data generated by the image processing (step S4). It should be noted that the printing is not executed at this time point, but instead the print data is held in the storage device until the determination is made on whether or not the printing can be carried out. As a result of the determination on whether or not the printing can be carried out, when the printing is executed, the print data is used, and when the printing is prohibited, the print data is deleted.

Also, when the document data of the print target is identified, the display processing unit displays attribute information on the document data of the print target on the display device. The attribute information is stored in the document box together with the document data. FIG. 5A and FIG. 5B illustrate exemplary attribute information of the document data that is displayed in the image forming apparatus according to the first embodiment. FIG. 5A illustrates an operation screen in a case where the printing ratio data with regard to the document data of the print target is stored. FIG. 5B illustrates an operation screen in a case where the printing ratio data with regard to the document data of the print target is not stored. As illustrated in FIG. 5A, if the printing ratio data exists, the user can determine the printing ratio of the document data, that is, a degree of a toner consumption amount with regard to the document data. If a print execution button on the operation screen illustrated in FIG. 5A is pressed, the display processing unit causes the printing ratio determination unit to execute the next processing.

As illustrated in FIG. 3, the printing ratio determination unit reads the condition data from the user data of the user who performs the job execution request. The printing ratio determination unit determines whether or not the printing ratio of the document data of the print target exceeds an upper limit value of the printing ratio specified by the condition data (step S5).

At this time, with respect to each of toner colors (herein, four colors of black (K), cyan (C), magenta (M), and yellow (Y)), it is determined whether or not the printing ratio of the document data of the print target exceeds the upper limit value of the printing ratio specified by the condition data. If the printing ratio exceeds the upper limit value with regard to at least one color, it is determined that the printing ratios of the document data of the print target do not satisfy the condition specified by the condition data. In the example of FIG. 5A, the printing ratios of the document data are black (K): 4%, cyan (C): 2%, magenta (M): 7%, and yellow (Y): 2%. In the condition data, if the upper limit values of the printing ratios are set as black (K): 5% and magenta (M): 3% (cyan (C) and yellow (Y) are not specified), as the printing ratio for magenta (M) of the document data exceeds the upper limit value, it is determined that the printing ratios of document data 31 do not satisfy the condition specified by the condition data. For example, in the condition data, if the upper limit values of the printing ratios are set as black (K): 4%, cyan (C): 5%, magenta (M): 8%, and yellow (Y): 3%, the printing ratios for all the colors of the document data are lower than or equal to the upper limit values, and it is therefore determined that the printing ratios of the document data satisfy the condition specified by the condition data.

In this manner, by changing the condition data for each color of the color material, in accordance with the use situations and the use purposes of the respective users, it is possible to effectively suppress the consumption amount of the color material.

As illustrated in FIG. 3, with regard to the document data of the print target, if it is determined that the printing ratios for all the toner colors do not exceed the upper limit values, the print processing unit executes the image processing and the printing of the document data (step S6). The print processing unit associates the printing ratios obtained at that time with the document data as the printing ratio data. Storage device 16 stores the printing ratio data associated with the document data in the document box (step S7).

It should be noted that the print processing unit may also associate setting information indicating the values of one or a plurality of print setting items with the printing ratio data. At this time, the printing ratio determination unit may determine in step S2 whether or not the printing ratio data corresponding to the setting information matched with one or a plurality of setting values specified by the job execution request is stored. To elaborate, the printing ratio data may be separately stored with regard to each of combinations of different setting values.

On the other hand, with regard to the document data of the print target, if it is determined that the printing ratio for at least one toner color exceeds the upper limit value, the display processing unit displays an error screen on the display device (step S8).

Figure 6:
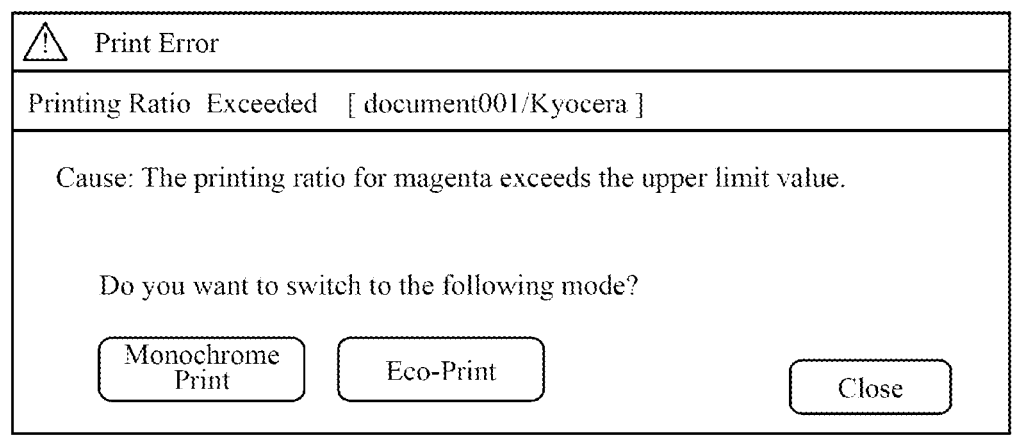
FIG. 6 illustrates an example error screen displayed when a print request is rejected.

FIG. 6 illustrates an exemplary error screen that is displayed when the print request is rejected in the image forming apparatus according to the first embodiment.

On this error screen, an operation button for switching the print mode is displayed together with an error message. In FIG. 6, an operation button for switching from a color print to a monochrome print ("monochrome print" button) and an operation button for switching to an eco-print for decreasing the resolution ("eco-print" button) are displayed. Also, an operation button for ending the processing without switching the print mode ("close" button) is displayed.

As illustrated in FIG. 3, if the operation button for switching the print mode is pressed (step S9), the print mode switching unit switches the print mode to another print mode corresponding to pressed operation button (step S10). The print processing unit executes the image processing and the printing of the document data under the other print mode (step S6). The print processing unit associates the printing ratios obtained in this print mode with the document data as the printing ratio data. Storage device 16 stores the printing ratio data associated with the document data in the document box (step S7). It should be noted that this setting on the print mode is also one of the print setting items described above.

In this manner, even when the printing is prohibited, the printing can be carried out in the other print mode, and without causing the user to feel inconvenienced, it is possible to suppress the consumption amount of the color material.

On the other hand, if the operation button for ending the processing without switching the print mode is pressed (NO in Step S9), the job management unit ends the processing without executing the printing.

In this manner, the printing of the document data that satisfies the condition on the printing ratios set for each user is permitted.

As described above, on the basis of the actual printing ratios with regard to the respective document data, the determination is made on whether or not the printing can be carried out, and it is therefore possible to appropriately prohibit the printing of the document data that consumes much of the color material.

(b) Processing at the Time of Setting of the Condition Data on Whether or not the Printing can be Carried Out with Regard to the Printing Ratio If a specified operation is performed on the input device while the administrator is logged in, the operation mode of the image forming apparatus is shifted to the setting mode for the condition data. In this setting mode, the restriction setting unit sets the condition on whether or not the printing can be carried out with regard to the printing ratio for each user while following the user operation on the input display by the administrator. To elaborate, the restriction setting unit generates a condition data on the specified user (general user) while following the user operation by the administrator to be reflected on the user data.

First, the restriction setting unit refers to the user data and displays a list of registered users on the display device. FIG. 7 illustrates an exemplary list of the registered users based on the user data that is displayed in the image forming apparatus according to the first embodiment. As illustrated in FIG. 7, on the operation screen of the display device, the check boxes are displayed for the respective users. If the administrator operates input device to check the check box and press the selection button, the user corresponding to the check box thus checked is selected.

When the user who is the set target of the condition data is selected, the restriction setting unit displays the setting screen for inputting the condition data with regard to the selected user on the display device. FIG. 8 illustrates an exemplary setting screen for setting the condition data on whether or not the printing can be carried out with regard to the printing ratio. As illustrated in FIG. 8, input field 52 for inputting check box 51 with regard to the respective toner colors and the upper limit value of the printing ratio are displayed on the setting screen of the display device. If the administrator operates the input device to check check box 51, input the upper limit value of the printing ratio in input field 52, and press an OK button, the restriction setting unit sets the upper limit value of the printing ratio with respect to the toner color of the check box thus checked. Storage device 16 stores the set upper limit value of the printing ratio in the user data. In the example of FIG. 8, when the OK button is pressed, the upper limit values of the printing ratios are set as black (K): 5%, magenta (M): 3% (the upper limit values for cyan (C) and yellow (Y) are not set). Similarly, it is also possible to change the condition data by the setting screen of FIG. 8.

In this manner, the upper limit values of the printing ratios with regard to the respective users are set by the administrator and stored in the user data.

As described above, according to the first embodiment, the printing ratio determination unit identifies the printing ratio of the document data and determines whether or not the identified printing ratio satisfies a specified condition. Also, in a case where the printing ratio determination unit determines that the printing ratio satisfies the specified condition, the job management unit causes the print processing unit to execute the printing based on the document data.

Therefore the printing of the document data that consumes much of the color material is prohibited, and it is possible to effectively suppress the consumption amount of the color material.

Second Embodiment

A second embodiment of the present disclosure is different from the first embodiment in that the host device has a printing ratio determination unit and a restriction setting unit. According to the second embodiment, on the basis of a driver program code of the host device, the determination on whether or not the printing can be carried out with regard to the printing ratio and the setting on the condition data are performed.

Figure 9:
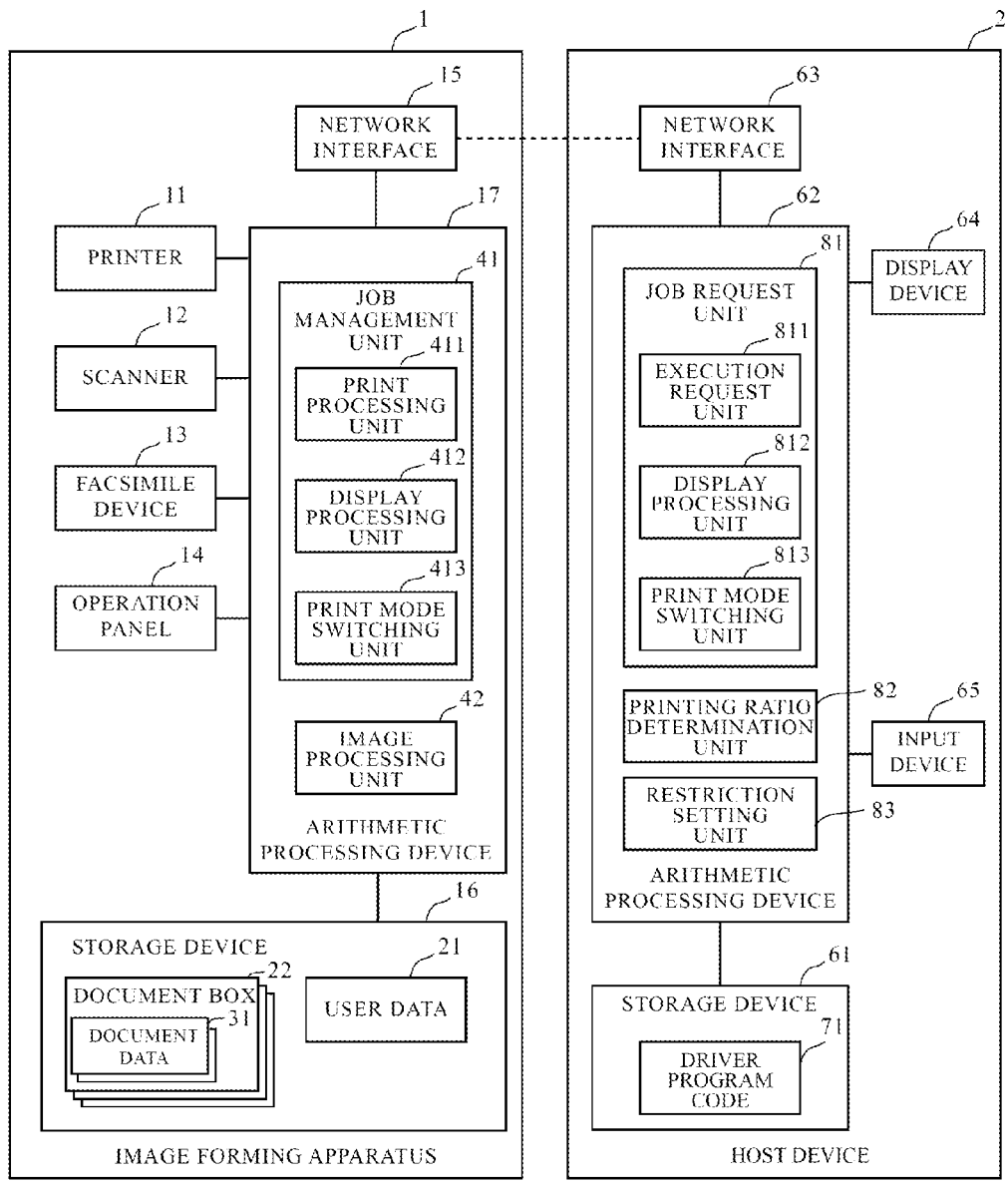
FIG. 9 illustrates configurations of a host device according to a second embodiment of the present disclosure and an image forming apparatus connected to the host device.

FIG. 9 illustrates configurations of the host device according to the second embodiment of the present disclosure and the image forming apparatus connected to the host device.

Image forming apparatus 1 is an image forming apparatus according to the second embodiment. Image forming apparatus 1 includes printer 11, scanner 12, facsimile device 13, operation panel 14, network interface 15, storage device 16, and arithmetic processing device 17. In this manner, a hardware configuration of image forming apparatus 1 is similar to that of the first embodiment. According to the second embodiment, by executing a print processing program code, arithmetic processing device 17 operates as job management unit 41 and image processing unit 42. Herein, job management unit 41 has print processing unit 411, display processing unit 412, and print mode switching unit 413. Image processing unit 42, print processing unit 411, display processing unit 412, and print mode switching unit 413 have configurations and functions similar to those of the first embodiment.

Host device 2 is a host device according to the second embodiment. Host device 2 is composed, for example, as a personal computer on which an operating system and a driver program code for image forming apparatus 1 are installed, or the like. Host device 2 has storage device 61, arithmetic processing device 62, network interface 63, display device 64, and input device 65.

Storage device 61 stores various pieces of information. For storage device 61, for example, a non-volatile large-capacity storage medium such as a non-volatile memory or a hard disk drive is used. Storage device 61 stores, for example, an operating system and driver program code 71 of image forming apparatus 1. It should be noted that driver program code 71 is stored in a recording medium having portability such as a CD-ROM and is installed from the recording medium to host device 2.

Network interface 63 is a circuit connected to a network that is not illustrated in the drawing and is adapted to perform a data communication with another device connected to the network (such as image forming apparatus 1).

Display device 64 displays various pieces of information to the user. For display device 64, a liquid crystal display or the like is used.

Input device 65 detects the user operation. For input device 65, a keyboard, a mouse, or the like is used.

Figure 10:
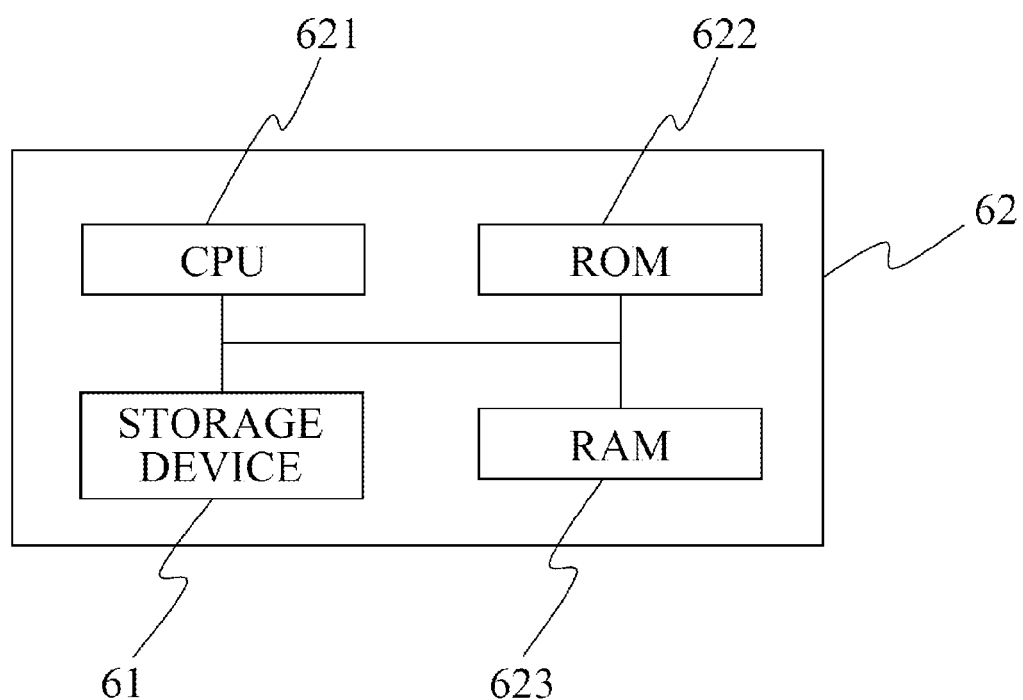
FIG. 10 illustrates a hardware architecture of an arithmetic processing device of the image forming apparatus according to the second embodiment.

As illustrated in FIG. 10, arithmetic processing device 62 is a computer having CPU 621, ROM 622, RAM 623, and the like. Arithmetic processing device 62 loads a program from ROM 622, storage device 61, or the like onto RAM 623 and operates as various processing units by executing program by CPU 621.

As illustrated in FIG. 9, according to the second embodiment, by executing driver program code 71, arithmetic processing device 62 operates job request unit 81, printing ratio determination unit 82, and restriction setting unit 83.

Job request unit 81 has execution request unit 811, display processing unit 812, and print mode switching unit 813.

Execution request unit 811 transmits the job execution request to image forming apparatus 1.

In a case where printing ratio determination unit 82 determines that the printing ratio of document data 31 does not satisfy a specified condition, display processing unit 812 displays an error screen on display device 64.

After the display start of the error screen, if the user operation for selecting another printable print mode is detected by input device 65, print mode switching unit 813 switches the print mode to the other print mode. The other print modes include the monochrome print at a time when the color print is specified, a print mode with a printing ratio lower than the current print mode (a draft print mode, an eco-print mode, etc.) and the like.

Printing ratio determination unit 82 identifies the printing ratio of document data 31 of the print target and determines whether or not the identified printing ratio satisfies the specified condition. If printing ratio determination unit 82 determines that the printing ratio satisfies the specified condition, execution request unit 811 transmits the job execution request for executing the printing based on document data 31 to image forming apparatus 1.

According to the second embodiment, print processing unit 411 obtains the printing ratio of document data 31 from host device 2 via network interface 15 at the time of the execution of the printing and associates printing ratio data indicating the printing ratio with document data 31. Storage device 16 stores the printing ratio data associated with document data 31 in document box 22.

Printing ratio determination unit 82 identifies the printing ratios for the respective toner colors and determines whether or not the identified printing ratios satisfy the specified condition. Printing ratio determination unit 82 reads the printing ratio data corresponding to document data 31 of the print target from storage device 16 via network interface 63. Printing ratio determination unit 82 identifies the printing ratio on the basis of the printing ratio data.

The printing ratio is calculated as a proportion of the number of dots printed on the printed image to an image processing result by image processing unit 42 (that is, the print data after the image processing). If the printing of document data 31 has not been executed and thus the printing ratio data of document data 31 is not stored, printing ratio determination unit 82 causes image processing unit 42 to execute the image processing that is a preprocessing of the printing on document data 31 to calculate the printing ratio. It should be noted that at this time point, the printing is not executed.

It should be noted that the condition for determining whether or not the printing can be carried out on the basis of the printing ratio is set as condition data for each user. The condition data is stored in document box 22 as attribute information in user data 21. Printing ratio determination unit 82 identifies the user who requests the printing of document data 31, identifies the specified condition for the user, and determines whether or not the printing ratio of document data 31 satisfies the condition specified by the condition data. Printing ratio determination unit 82 classifies the user who has logged in image forming apparatus 1 as the user who requests the printing or identifies the user who requests the printing from the user ID or the like included in the job execution request from host device 2. In this manner, by changing the conditions for each user, in accordance with the use situations and the use purposes of the respective users, the consumption amount of the color material may effectively be suppressed.

Restriction setting unit 83 sets the condition on whether or not the printing can be carried out with regard to the printing ratio for each user while following the user operation on input device 65 by the administrator. Restriction setting unit 83 generates the condition data while following the user operation and transmits the condition data to image forming apparatus 1 via network interface 63 to be reflected on user data 21.

Next, host device 2 according to the second embodiment and an operation of image forming apparatus 1 will be described. Described herein are (a) a processing at the time of the printing of the document image based on document data 31 and (b) a processing at the time of the setting of the condition data on whether or not the printing can be carried out with regard to the printing ratio.

(a) Processing at the Time of the Printing of the Document Image Based on Document Data 31

As illustrated in FIG. 9, if the operation for the job execution request on input device 65 by the logged-in user exists, printing ratio determination unit 82 identifies the user who performs the job execution request. First, via network interface 63, display processing unit 812 requests image forming apparatus 1 for a list of document data 31 that is stored in document box 22 of the user. When image forming apparatus 1 receives the request via the network, job management unit 41 of image forming apparatus 1 transmits the list. When host device 2 receives the list of document data 31, display processing unit 812 displays the list on display device 64 and identifies document data 31 selected from the list as document data 31 of the print target.

The check boxes with regard to the respective pieces of document data are displayed on the operation screen of display device 64. To be more specific, display device 64 can display the list of document data 31 and the check box in a format illustrated in FIG. 4 similarly as in the first embodiment. If the check box is checked and the selection button is pressed by the user while operating input device 65, document data 31 of the check box thus checked is selected.

If document data 31 of the print target is identified, printing ratio determination unit 82 determines whether or not the printing ratio data with regard to document data 31 of the print target is stored in document box 22 by inquiring image forming apparatus 1 via network interface 63.

When the printing ratio data with regard to document data 31 of the print target is stored in document box 22, printing ratio determination unit 82 reads the printing ratio data from image forming apparatus 1.

In this manner, the determination on whether or not the printing is prohibited is promptly carried out by using the printing ratio stored in storage device 16 instead of calculating the printing ratio based on the print data again.

On the other hand, if the printing ratio data with regard to document data 31 of the print target is not stored in document box 22, printing ratio determination unit 82 causes image processing unit 42 of image forming apparatus 1 to execute the image processing on document data 31. Printing ratio determination unit 82 obtains the print data generated by the image processing from image forming apparatus 1. Printing ratio determination unit 82 calculates a printing ratio on the basis of the obtained print data. It should be noted that the printing is not executed at this time point, but the print data is held in storage device 16 of image forming apparatus 1 until the determination is made on whether or not the printing can be carried out. As a result of the determination on whether or not the printing can be carried out, when the printing is executed, the print data is used, and when the printing is prohibited, the print data is deleted.

Also, if document data 31 of the print target is identified, display processing unit 812 obtains the attribute information on document data 31 of the print target from image forming apparatus 1 to be displayed on display device 64. To be more specific, display device 64 can display similarly as in the first embodiment, with the attribute information and the printing ratio in a format illustrated in FIG. 5A or FIG. 5B. The attribute information is stored in document box 22 of image forming apparatus 1 together with document data 31. If the printing ratio data exists, the user can determine the printing ratio of document data 31, that is, the degree of the toner consumption amount with regard to document data 31. If the print execution button on the operation screen is pressed, display processing unit 812 causes printing ratio determination unit 82 to execute the next processing.

Printing ratio determination unit 82 reads the condition data in user data 21 of the user who performs the job execution request from image forming apparatus 1 via network interface 63. Printing ratio determination unit 82 determines whether or not the printing ratio of document data 31 of the print target exceeds the upper limit value of the printing ratio specified by the condition data.

Herein, if the upper limit value of the printing ratio is set for each toner color, the printing ratio is determined for each color similarly as in the first embodiment. In this manner, by changing the condition data for each color of the color material, in accordance with the use situations and the use purposes of the respective users, it is possible to effectively suppress the consumption amount of the color material.

Then, with regard to document data 31 of the print target, if it is determined that the printing ratios for all the toner colors do not exceed the upper limit values, execution request unit 811 generates a job execution request for executing the image processing and the printing of document data 31 and transmits the request to image forming apparatus 1 via network interface 63. When the job execution request is received by image forming apparatus 1, print processing unit 411 causes printer 11 to execute the processing specified by the job execution request. Then, print processing unit 411 of image forming apparatus 1 associates the printing ratios obtained at that time with document data 31 as the printing ratio data. Storage device 16 stores the printing ratio data associated with document data 31 in document box 22.

It should be noted that print processing unit 411 may also associate the setting information indicating the values of one or a plurality of print setting items specified by the job execution request with the printing ratio data. At this time, printing ratio determination unit 82 may determine whether or not the printing ratio data corresponding to the setting information matched with one or a plurality of set values specified by the job execution request is stored.

On the other hand, with regard to document data 31 of the print target, if it is determined that the printing ratio for at least one toner color exceeds the upper limit value, display processing unit 812 displays an error screen on display device 64.

To be more specific, similarly as in the first embodiment, display device 64 can display the error screen including the operation button for switching the print mode in a format illustrated in FIG. 6 together with an error message. Also, the operation button for switching from the color print to the monochrome print ("monochrome print" button) and the operation button for switching to the eco-print for decreasing the resolution ("eco-print" button) are displayed. Furthermore, the operation button for ending the processing without switching the print mode ("close" button) is displayed.

If the operation button for switching the print mode is pressed, print mode switching unit 813 switches the print mode to another print mode corresponding to the pressed operation button. Execution request unit 811 generates a job execution request for executing the image processing and the printing of document data 31 in the other print mode and transmits the request via network interface 63 to image forming apparatus 1. Print processing unit 411 of image forming apparatus 1 associates the printing ratios obtained in this print mode with document data 31 as the printing ratio data. Storage device 16 stores the printing ratio data associated with document data 31 into the document box 22. It should be noted that this setting on the print mode is also one of the print setting items described above.

In this manner, even when the printing is prohibited, the printing can be carried out in the other print mode, and without causing the user to feel inconvenienced, it is possible to suppress the consumption amount of the color material.

On the other hand, if the operation button for ending the processing without switching the print mode is pressed, job request unit 81 ends the processing without transmitting the job execution request.

In this manner, on host device 2, the printing of document data 31 that satisfies the condition on the printing ratio set for each user is permitted.

As described above, on the basis of the actual printing ratios with regard to the respective document data, the determination is made on whether or not the printing can be carried out, and it is therefore possible to appropriately prohibit the printing of document data 31 that consumes much of the color material.

(b) Processing at the Time of Setting of the Condition Data on Whether or not the Printing can be Carried Out with Regard to the Printing Ratio If a specified operation is performed on input device 65 while the administrator logs in image forming apparatus 1 from host device 2, the operation mode of host device 2 is shifted to the setting mode for the condition data. In this setting mode, restriction setting unit 83 sets the condition on whether or not the printing can be carried out with regard to the printing ratio for each user while following the user operation on input device 65 by the administrator. To elaborate, restriction setting unit 83 generates a condition data on the specified user (general user) while following the user operation by the administrator. Restriction setting unit 83 transmits the generated condition data to image forming apparatus 1 via network interface 63 and requests image forming apparatus 1 to reflect the condition data on user data 21. While following the request from restriction setting unit 83, arithmetic processing device 17 of image forming apparatus 1 reflects the generated condition data on user data 21.

First, restriction setting unit 83 reads user data 21 from image forming apparatus 1 via network interface 63 and display the list of the registered user on display device 64. To be more specific, similarly as in the first embodiment, display device 64 can display the check boxes for the respective users in a format illustrated in FIG. 7. If the check box is checked and the selection button is pressed by the administrator while operating the input device, the user corresponding to the check box thus checked is selected.

When the user who is the set target of the condition data is selected from the list, restriction setting unit 83 displays the setting screen for inputting the condition data with regard to the selected user on display device 64. To be more specific, similarly as in the first embodiment, display device 64 can display input field 52 for inputting check box 51 and the upper limit value of the printing ratio with respect to the respective toner colors in a format illustrated in FIG. 8. If the administrator operates the input device to check check box 51, input the upper limit value of the printing ratio in input field 52, and press the OK button, restriction setting unit 83 sets the upper limit value of the printing ratio with respect to the toner color of the check box thus checked. Storage device 16 stores the set upper limit value of the printing ratio in the user data. In the example of FIG. 8, when the OK button is pressed, the upper limit values of the printing ratios are set as black (K): 5%, magenta (M): 3% (the upper limit values for cyan (C) and yellow (Y) are not set). Similarly, it is also possible to change the condition data by the setting screen of FIG. 8.

On the setting screen of display device 64, if the toner color that an upper limit value of the printing ratio is set is selected and the upper limit value is input, restriction setting unit 83 generates condition data on the basis of the input information. Then, restriction setting unit 83 transmits the generated condition data to image forming apparatus 1 via network interface 63 and requests image forming apparatus 1 to add the condition data to user data 21. While following the request from restriction setting unit 83, arithmetic processing device 17 of image forming apparatus 1 adds the generated condition data to user data 21.

In this manner, on host device 2, the upper limit values of the printing ratios with regard to the respective users are set by the administrator and stored in user data 21 of image forming apparatus 1.

As described above, according to the second embodiment, on the host device 2, similarly as in the first embodiment, the determination is made on whether or not the printing can be performed on the basis of the printing ratio for document data 31. To elaborate, according to the second embodiment, printing ratio determination unit 82 identifies the printing ratio of document data 31 and determines whether or not the identified printing ratio satisfies the specified condition. Also, if printing ratio determination unit 82 determines that the printing ratio satisfies the specified condition, job request unit 81 requests image forming apparatus 1 to execute the printing based on document data 31.

In this manner, the printing of document data 31 that satisfies the condition on the printing ratio set for each user is permitted.

Therefore the printing of document data 31 that consumes much of the color material is prohibited, and it is possible to effectively suppress the consumption amount of the color material.

It should be noted that the above-mentioned respective embodiments are preferred examples of the present disclosure, but the present disclosure is not limited to these, and various modifications and changes can be made without departing from the gist of the present disclosure.

For example, according to the above-mentioned respective embodiments, it is possible to switch the print mode to the monochrome print and the eco-print on the error screen when the excess printing ratio occurs, but it is also possible to switch to an aggregate print such as 2-in-1 or 4-in-1. Also, a switch to a two-color print without using colors of the excess printing ratios (printing that uses black and another color) may be performed. Also, a switch of the print mode to a draft print mode having a low resolution like the eco-print may be performed. Furthermore, a switch to a print mode having a still lower resolution if the printing ratio exceeds the upper limit value in a state where the draft print or the eco-print is set (for example, a print mode having a resolution reduced to one third) may be performed. Therefore the user can find out which print mode corresponds to the non-prohibited printing.

Also, according to the above-mentioned respective embodiments, in the user data, the attribute information of the user may include department information indicating a department to which the user belongs, and further, condition data with respect to the department may be stored in the storage device or the like. In this case, the printing ratio determination unit identifies the department to which the user belongs on the basis of the department information and reads the condition data on the department. Then, the printing ratio determination unit may determine whether or not the excess printing ratio occurs on the basis of the condition data. Also, according to the above-mentioned respective embodiments, the same condition data may be used with respect to all the users.

Also, according to the above-mentioned respective embodiments, the data stored in the storage device such as the document box and the user data may be stored in a server connected to the network (a file server, a web server, or the like). In this case, the image forming apparatus and the host device may access the server via the network and perform read and write of those pieces of data.

Also, according to the above-mentioned respective embodiments, the printing ratio determination unit may permit the printing if a total of the printing ratios of the document data is lower than or equal to a total of the printing ratio upper limit values of the condition data even if the print data of one of the colors exceeds the upper limit value.

The present disclosure can be applied, for example, to an image forming apparatus such as a printer, a copier, a facsimile device, or a multifunctional device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
   a print processing unit configured to obtain a printing ratio of document data at a time of print execution of the document data and associate printing ratio data indicating the obtained printing ratio with the document data; and
   a printing ratio determination unit configured to identify the printing ratio of the document data from the printing ratio data associated with the document data and determine whether or not the identified printing ratio satisfies a specified condition, wherein:
   the document data is document data in a document box,
   the document box is configured to store the printing ratio of the document data as the printing ratio data,
   the print processing unit is configured to obtain the stored printing ratio at the time of print execution of the document data and associate one or a plurality of print setting items with the printing ratio data indicating the obtained printing ratio at the time of print execution of the document data,
   the printing ratio determination unit is configured to determine whether or not the printing ratio data corresponding to setting information matched with one or the plurality of setting values specified by the job execution request is stored, and
   if the printing of the document data has not been executed and the printing ratio data is not stored, the printing ratio determination unit is configured to execute an image processing that is a preprocessing of the printing on the document data to calculate the printing ratio and the print processing unit is configured to obtain the calculated printing ratio at the time of print execution of the document data.

2. The image forming apparatus according to claim 1, wherein the print processing unit is configured to execute printing based on the document data if the printing ratio determination unit determines that the printing ratio satisfies the specified condition.

3. The image forming apparatus according to claim 1, wherein the printing ratio determination unit is configured to identify the printing ratio for each toner color and determine whether or not the identified respective printing ratios satisfy a specified condition.

4. The image forming apparatus according to claim 3, wherein the print processing unit is configured to execute printing based on the document data if the identified respective printing ratios for all toner color satisfy the specified condition.

5. The image forming apparatus according to claim 3, wherein the specified condition is set as printing ratio upper limit values for each toner color, and
   wherein if the identified printing ratio for any toner color exceeds the printing ratio upper limit value for its toner color, the printing ratio determination unit is configured to determine whether or not a total of the printing ratios is lower than or equal to a total of the upper limit values and the print processing unit is configured to execute printing based on the document data if the total of the printing ratios is lower than or equal to the total of the printing ratio upper limit values.

6. The image forming apparatus according to claim 1,
   wherein the specified condition with regard to the printing ratio is set for each user, and
   wherein the printing ratio determination unit is configured to identify a user who requests the printing of the document data, identify the specified condition with regard to the user, and determine whether or not the printing ratio satisfies the condition.

7. The image forming apparatus according to claim 1, further comprising:
   an input device configured to accept a user operation; and
   a restriction setting unit configured to set the specified condition while following a user operation on the input device.

8. The image forming apparatus according to claim 1, further comprising:
   a display device; and
   a display processing unit configured to display an error screen on the display device if the printing ratio determination unit determines that the printing ratio does not satisfy the specified condition.

9. The image forming apparatus according to claim 8, further comprising:
   an input device configured to detect a user operation; and
   a print mode switching unit configured to switch, if a user operation for selecting another print mode that the printing can be carried out is detected by the input device after display start of the error screen, a print mode to the other print mode.

10. The image forming apparatus according to claim 9, wherein the print mode switching unit is configured to switch a print mode to the print mode having a lower printing ratio if a user operation for selecting the print mode having the printing ratio lower than a current print mode is detected by the input device after the display start of the error screen.

11. An image forming apparatus comprising:
    a print processing unit configured to obtain a printing ratio of document data at a time of print execution of the document data and associate printing ratio data indicating the obtained printing ratio with the document data;
    a printing ratio determination unit configured to identify the printing ratio of the document data from the printing ratio data associated with the document data and determine whether or not the identified printing ratio satisfies a specified condition;
    a display device;
    a display processing unit configured to display an error screen on the display device if the printing ratio determination unit determines that the printing ratio does not satisfy the specified condition;
    an input device configured to detect a user operation; and
    a print mode switching unit configured to switch, if a user operation for selecting another print mode that the printing can be carried out is detected by the input device after display start of the error screen, a print mode to the other print mode, wherein:
    the document data is document data in a document box,
    the document box is configured to store the printing ratio of the document data as the printing ratio data, the print processing unit is configured to obtain the stored printing ratio at the time of print execution of the document data, if the printing of the document data has not been executed and the printing ratio data is not stored, the printing ratio determination unit is configured to execute an image processing that is a preprocessing of the printing on the document data to calculate the printing ratio and the print processing unit is configured to obtain the calculated printing ratio at the time of print execution of the document data, the print mode switching unit is configured to switch a print mode to the print mode having a lower printing ratio if a user operation for selecting the print mode having the printing ratio lower than a current print mode is detected by the input device after the display start of the error screen, and the print mode switching unit is configured to switch a print mode to the print mode having a still lower printing ratio if the lower printing ratio exceeds an upper limit value in a state where the print mode having the lower printing ratio is set.

\* \* \* \* \*